Feb. 26, 1929.　　　　　　　　　　　　　　　　　　　　　1,703,652
L. AZARRAGA
AEROPLANE DOLLY
Filed Jan. 16, 1928　　　　　2 Sheets-Sheet 1

INVENTOR.
LUIS AZARRAGA.
BY
ATTORNEY.

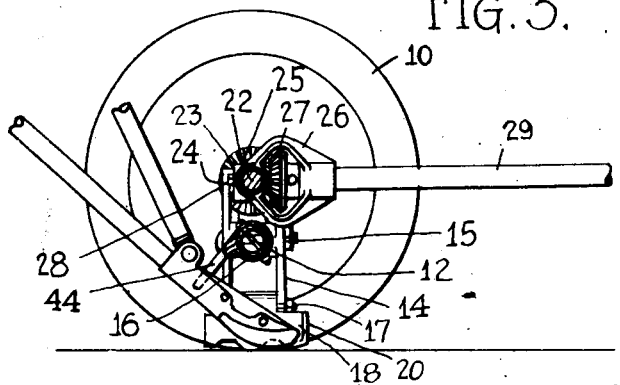
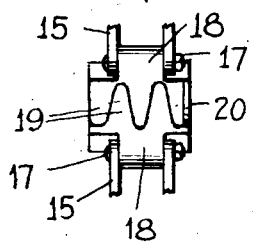
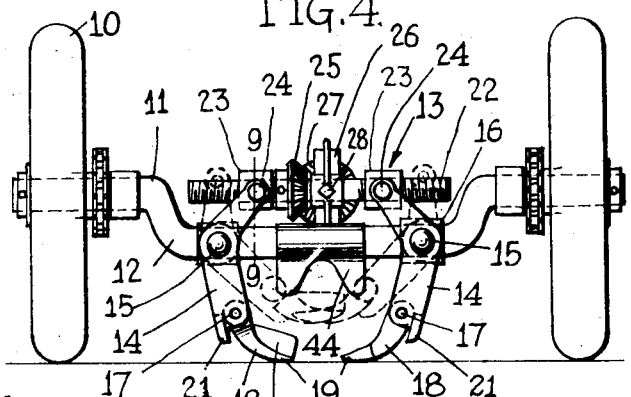
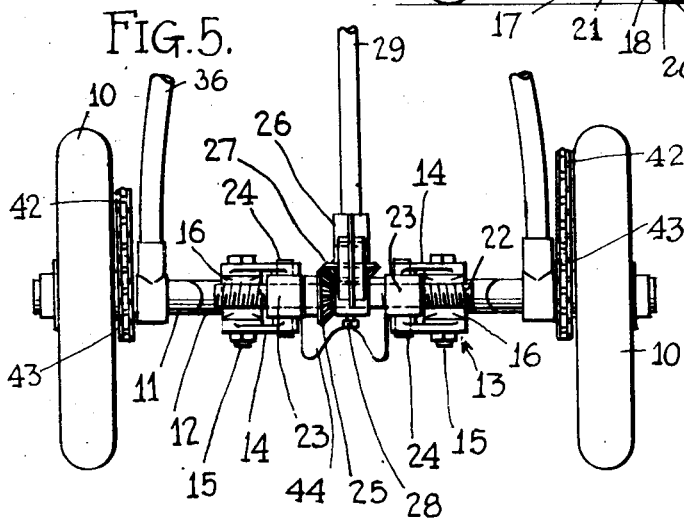
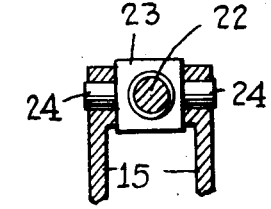

Patented Feb. 26, 1929.

1,703,652

UNITED STATES PATENT OFFICE.

LUIS AZARRAGA, OF HEMPSTEAD, NEW YORK.

AEROPLANE DOLLY.

Application filed January 16, 1928. Serial No. 246,944.

My invention relates to handling trucks for heavy objects and is more particularly concerned with a so-called aeroplane dolly.

An object of the invention is to provide a one man aeroplane dolly, i. e., an aeroplane dolly in which provision is made for raising the aeroplane, for supporting it when raised, and for transporting it from place to place; the operations, in each instance, being accomplished single handed, with a minimum of effort and with a maximum of facility and ease.

A further object of the invention is to provide an aeroplane dolly in which the supporting wheels thereof are manually driven thru an arrangement of hand operated driving cranks, in combination with a body engaging frame portion adapted to take the body pressure of the operator having the dolly under control.

A still further object of the invention is to provide an aeroplane dolly having lifting devices or claws hung from its supporting frame, said devices or claws being adapted to engage, lift and support the aeroplane (usually the tail end thereof) while in transportation, and being operable from a point in proximity to the body engaging portion of said frame.

A still further object of the invention is to provide a one man dolly in which all of the manually controlled devices thereof, to wit: the driving cranks, one for each wheel, the lifting or jacking crank, and the body engaging portion aforesaid, are closely grouped together and conveniently located at the outer end of the dolly frame.

Other and further objects of the invention will be hereinafter disclosed.

In the drawings:

Fig. 3 is a longitudinal vertical sectional view;

Fig. 4 is a rear end elevation;

Fig. 5 is a plan view of that portion of the dolly in the vicinity of its supporting wheels;

Fig. 8 is a plan view of the co-acting claws interlocked, and

Fig. 9 is a section on the line 9—9 of Fig. 4.

Figure 7:
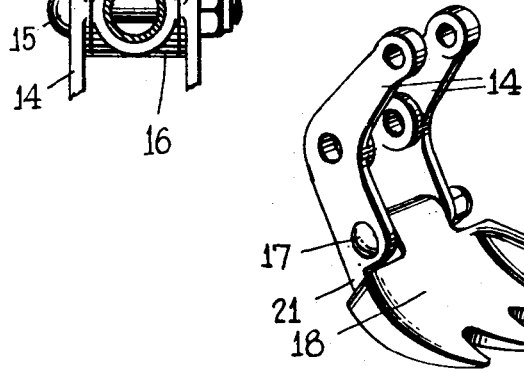
Fig. 7 is a perspective view of one of the lifting claws.

In the embodiment of the invention selected for illustration, an aeroplane dolly of the one man, two wheel type, is shown. The wheels 10 are mounted on a non-rotatable axle 11 having a depressed or low lying intermediate portion 12 to which a lifting jack 13 is fastened. The jack 13 comprises two levers 14 of bell crank form pivoted as at 15 to the axle and bowed outwardly and oppositely as indicated in Fig. 4. Preferably the levers 11 (see Fig. 7) are double walled or longitudinally divided to position one wall thickness on each side of an enlargement 16 of the axle, the pivot pins 15 for the levers being carried thru said enlargements.

At its lower end each lever 15 has pivoted thereto as at 17 a substantially spoon shaped claw 18. These claws 18 are adapted to normally hang suspended from the levers 15 to rest, when not in use, lightly on the ground. Along their leading edges said claws are provided with teeth 19 and along their rear edges they are provided with upstanding flanges 20. When brought together, the teeth 19 of the co-acting claws interlock. A lug 21 formed at the outer end of each lever 15 serves as a stop against which its associated claw is adapted to bear when forced outwardly during a jacking-up operation. Thus restricted in movement the claws, during use, will first ride along the surface of the ground as the levers move oppositely until the biting edge thereof is forced beneath the tail skid or other object to be lifted, after which movement, the weight of the object is carried jointly by the co-acting claws.

The means for oppositely moving the levers 15 comprises a double acting transversely extending worm or operating screw 22. At opposite sides of its transverse center line said worm 22 is oppositely threaded, each said threaded portion having mounted thereon a travelling collar 23 to which the inner or upper ends of the levers 15 are provided as at 24. Thus arranged, as the worn 22 is rotated, the collars 23 are caused to oppositely move either toward or away from each other, and the levers 15 either simultaneously inwardly and upwardly or outwardly and downwardly as the case may be.

The worm 22 is full floating at all times. Intermediately of its ends it is provided with a gear 25 and with a bracket 26. The gear 25 is in mesh with a second gear 27 and is pinned and fastened to the worm. The bracket 26, tho pinned as at 28 to the worm, is so mounted thereon as to in no way interfere with its rotation, merely moving up and down with the worm during its operation. The gear 27 is mounted on a shaft 29 extending off from the worm 22 at a right angle. Said shaft 29 is journaled at one end in the bracket 26 and at its opposite end it is pinned as at 30 for axial sliding movement in a sleeve 31 pivoted as at 32 to an extension 33 of said shaft. This shaft extension 33 is suitably journaled in an enlargement 34 of the dolly frame. The purpose of the pivotal connection 32 and the sliding connection aforesaid is to admit of the floating movement of the worm 22 regardless of the position or angularity of said frame. At its outer end the shaft comprising the elements 29, 31 and 33 is provided with an operating or jack crank 35 by means of which said shaft, and hence the worm 22, is manually rotated.

The dolly frame within which the outer shaft extension 33 is journaled comprises side frame members 36, a cross-frame member 37, side frame extensions 38 and a body engaging or body encircling frame portion 39. The side frame members 36 at their forward ends are mounted for rotation on the axle 11 to the end that said frame can be raised and lowered according to the height of the operator. At opposite sides of the body engaging portion 39 of said frame and between the side frame members 36 and the extensions 38 thereof, operating or driving cranks 40 are provided. These cranks 40 are suitably connected with sprockets 41 over which chains 42 are carried, the chains 42, at the opposite end of the frame being carried over sprockets 43 mounted on the axle 11 to drive the wheels 10 as the cranks 40 are turned. Moreover, if desired, an element 44 may be hung from the axle 10 directly above the claws 18 to hold the tail skid in position thereon when raised.

Figure 1:
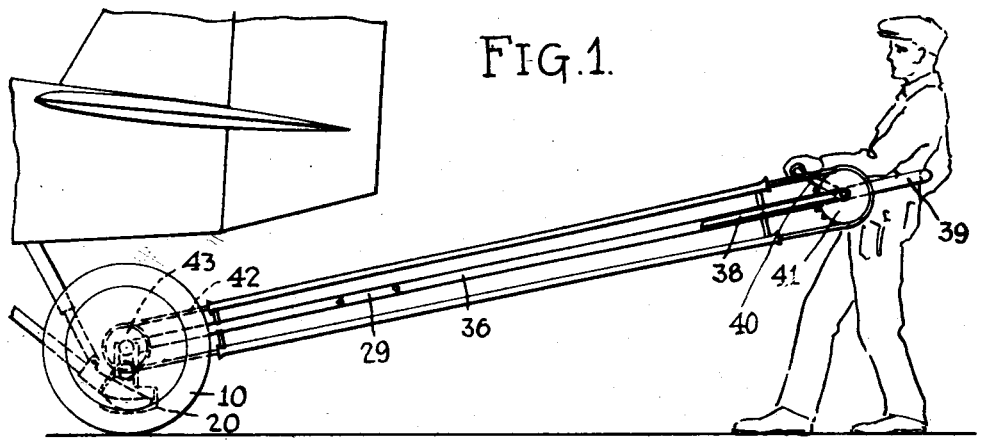
Fig. 1 is a side elevation of the dolly.
Figure 2:
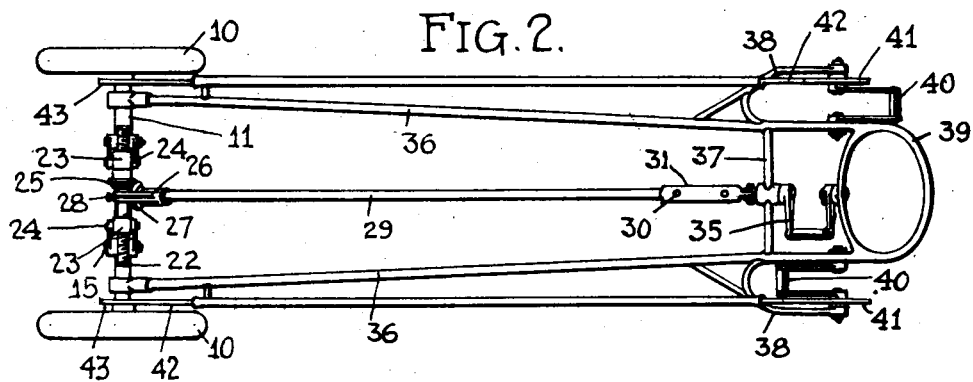
Fig. 2 is a plan view.
Figure 6:
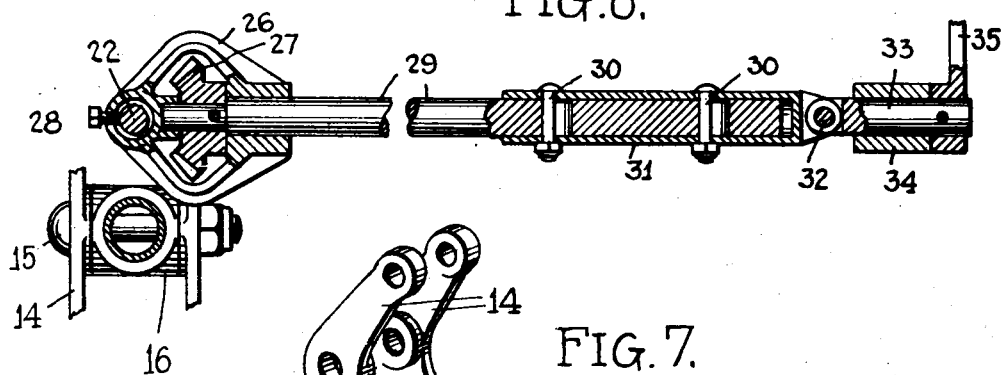
Fig. 6 is an enlarged sectional view of the connection extending between the lifting or jacking crank and its associated worm.

In operation, the operator first slips the body engaging or body encircling frame portion 39 around his waist as indicated in Fig. 1. Thus encircled the operator, by moving either forward or backward, can wheel the dolly (unloaded) until the lifting jack or claws 18 thereof are positioned one each at opposite sides of the object (usually the tail skid of an aeroplane) to be lifted. With the claws thus positioned the jacking crank 35 is turned and the claws 18 forced inwardly and upwardly beneath the tail skid to raise it off the ground. As the claws 18 move inwardly and upwardly the teeth 19 thereof interlock beneath the tail skid to create therebeneath a spoon-shaped pocket or recess within which said skid firmly rests. The tail skid having been thus jacked up or raised off the ground, the aeroplane, of which the skid forms a part, can be wheeled from place to place as desired. If the aeroplane is heavy or hard to move, the cranks 40 can be turned and the wheels 10 of the dolly rotated either forward or backward. The power applied to the wheels 10 is accordingly two-fold. Not only is the pressure exerted on the dolly by the operator pressing on the frame 39 applied to the wheels 10, but in addition, the cranking operation is simultaneously applied, such combined pressure and cranking effort being of such proportion that one man can direct, shift and transport even a large and relatively heavy machine with a minimum of effort and with a maximum of facility and ease.

While I have described my invention in detail in its present preferred embodiment, it will be obvious to those skilled in the art after understanding my invention, that various changes and modifications may be made therein without departing from the spirit or scope thereof. I aim in the appended claims, to cover all such modifications and changes.

What I claim is:

1. An aeroplane dolly including an axle, wheels mounted on said axle, a frame extending off from said axle and provided at its outer end with a body frame, a driving connection for said wheels extending lengthwise said frame, and means carried by said body frame for driving said connection.

2. An aeroplane dolly including an axle, wheels mounted on said axle, a frame extending off from said axle, a body engaging frame portion mounted at the outer end of said frame, and a driving connection for said wheels extending off therefrom to a point within reach of said body engaging frame portion.

3. An aeroplane dolly including an axle, wheels mounted on said axle, a frame extending off from said axle, a body engaging frame portion mounted at the outer end of said frame, and a driving connection for said wheels extending lengthwise said frame and including hand cranks positioned, one each, at opposite sides of said body engaging frame portion.

4. An aeroplane dolly including a non-rotatable axle, wheels mounted on said axle, a frame extending off from said axle, a body encircling frame portion mounted at the outer end of said frame, a separate driving connection for each wheel, and a hand crank for each said driving connection mounted at the outer frame end, one each at opposite sides of said body encircling frame portion.

5. An aeroplane dolly, including a non-rotatable axle, wheels mounted on said axle, claws hung below said axle to engage and lift the aeroplane as said claws are moved, a frame extending off from said axle, and means carried by said frame and operable from the outer end thereof to move said claws.

6. An aeroplane dolly including an axle, wheels mounted on said axle, relatively movable claws hung below said axle to engage the aeroplane, a transversely extending worm to which said claws are connected, and by means of which said claws are raised and lowered as said worm is rotated, a frame extending off from said axle and by means of which the dolly is moved from place to place, and means operable from the outer frame end to rotate said worm.

7. An aeroplane dolly including a wheeled supporting frame, claw-end levers carried by said frame, a worm engaging said levers and by means of which the claw ends thereof are simultaneously moved either inwardly and upwardly or outwardly and downwardly according to the direction of rotation of said worm, and means to rotate said worm carried by said frame.

8. The combination, in an aeroplane dolly, of a wheeled supporting frame including a body engaging portion distantly removed from the wheel end of said frame, wheel driving means extending along said frame and manually operable from a point in proximity to said body engaging portion thereof, mechanism carried by said frame to lift and support the aeroplane, and means likewise manually operable from a point in proximity to said body engaging frame portion to actuate said mechanism.

9. The combination, in an aeroplane dolly, of a wheeled supporting frame, mechanism carried by said frame to lift and support the aeroplane in condition for transportation, mechanism carried by said frame for driving the wheels thereof during transportation, a body engaging frame portion extending off from said supporting frame, and devices grouped about said body engaging frame portion for manually controlling the operation of said mechanisms.

In testimony whereof I hereunto affix my signature.

LUIS AZARRAGA.